April 7, 1925.

H. E. HODGSON

ELECTROMAGNETIC BRAKE

Filed April 12, 1924

1,532,138

INVENTOR
Howard E. Hodgson
BY
ATTORNEY

Patented Apr. 7, 1925.

1,532,138

UNITED STATES PATENT OFFICE.

HOWARD E. HODGSON, OF MILWAUKEE, WISCONSIN, ASSIGNOR TO THE CUTLER-HAMMER MFG. CO., OF MILWAUKEE, WISCONSIN, A CORPORATION OF WISCONSIN.

ELECTROMAGNETIC BRAKE.

Application filed April 12, 1924. Serial No. 705,988.

*To all whom it may concern:*

Be it known that I, HOWARD E. HODGSON, a citizen of the United States, residing at Milwaukee, in the county of Milwaukee and State of Wisconsin, have invented new and useful Improvements in Electromagnetic Brakes, of which the following is a full, clear, concise, and exact description, reference being had to the accompanying drawing, forming a part of this specification.

This invention relates to electromagnetic brakes and while not limited thereto is particularly applicable to alternating current solenoid operated brakes.

Brakes of various designs have heretofore been employed including brake shoes having spring means associated therewith for setting the same and a solenoid for releasing the shoes against the action of such means. The spring means is usually adjustable to vary the braking pressure and in practice it has been found that if the solenoid is of sufficient size to release the shoes under relatively heavy braking pressures considerable destructive hammering will occur in the solenoid if the spring means is adjusted for light braking pressures. Furthermore, the manufacturing cost of brakes as heretofore designed was relatively high due to the fact that it was necessary to employ a short stroke solenoid of large dimensions.

The present invention has among its objects to provide a simple, compact and efficient brake which will overcome the aforesaid objections.

Another object is to provide a brake having a solenoid for releasing the same and spring means for effecting setting thereof, such means being adjustable for variation of the braking effect without substantial variation of the load on the solenoid throughout its entire stroke.

Various other objects and advantages of the invention will hereinafter appear.

The accompanying drawing illustrates a brake embodying the invention which will now be described, it being understood that the brake illustrated is susceptible of modification without departing from the scope of the appended claims.

Figure 1:
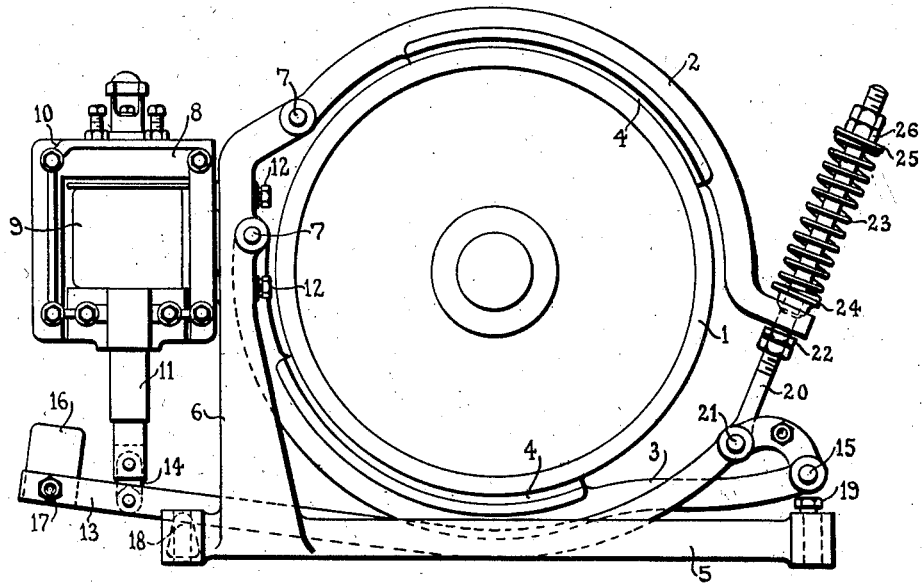
Figure 1 is a side elevational view of the brake.
Figure 2:
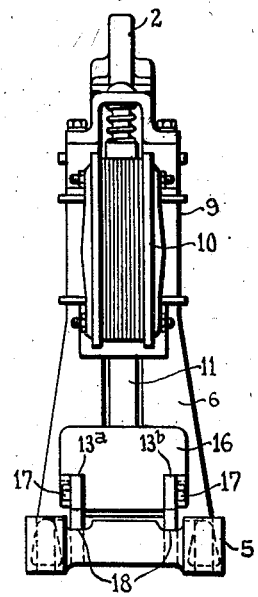
Fig. 2 is an end elevational view thereof.

Referring to Fig. 1, the same illustrates a drum 1 to be secured to the motor or other device to be braked, opposed brake shoes 2 and 3 having linings 4 for frictionally engaging said drum and a base 5 having a vertical arm 6 to which said shoes are pivotally secured by pins 7.

The brake operating means includes a solenoid 8 having a winding 9 carried by a laminated magnet frame 10 and a plunger 11 reciprocable within said winding. Magnet frame 10 is fixed to arm 6 by bolts 12 and the plunger 11 is operatively connected to an operating arm 13 by a link 14. Arm 13 is arranged substantially horizontally below the drum 1 and includes spaced side members $13^a$ and $13^b$, the right hand ends of said members being arranged on opposite sides of the free end of brake shoe 3 and being pivotally connected thereto by a pin 15. The left hand end of arm 13 has a weight member 16 fixed between the side members thereof by a bolt 17 and downward movement of the left hand end of said arm is limited by stops 18 on supporting base 5. Base 5 also carries an adjustable stop 19 which serves to limit downward movement of the free end of brake shoe 3 and the right hand end of arm 13.

A rod 20 is pivotally connected to arm 13 at a point adjacent the right hand end thereof by a pin 21 and said rod extends upwardly through an opening in the free end of brake shoe 2. Rod 20 is threaded throughout substantially its entire length and carries an adjustable stop 22 for engaging the underside of brake shoe 2. Also said rod has a spring 23 mounted thereon which is held under compression between collars 24 and 25 slidable on said rod. Collar 24 bears on the upper side of brake shoe 2 while collar 25 is adjustable by a nut 26 to vary the degree of compression of spring 23.

From the foregoing it is apparent that arm 13 tends to move under the action of gravity to a position wherein the left hand end thereof rests against stops 18. Furthermore it is apparent that if spring 23 is compressed the same tends to move arm 13 out of engagement with stop 18 and also tends to move the free ends of brake shoes 2 and 3 towards each other for setting thereof. The degree of compression of spring 23 determines the setting pressure of the shoes 2 and 3 on drum 1 and it is apparent that compression of said spring to a degree sufficient to raise arm 13 out of engagement with stop 18 provides a maximum setting pressure determined by the weight of arm 13. However, by reducing the compression of spring 20 the setting pressure can be reduced to a minimum determined by the weight of the brake shoes 2 and 3 and the arm 13.

Stop 22 is adjusted so that upon setting of the brake shoes the same slightly clears the underside of brake shoe 2. Upon energization of solenoid 8 arm 13 is moved in a clockwise direction from the position shown in the drawing and after a slight initial movement of said arm from such position stop 22 engages the underside of brake shoe 2 and upon continued movement of said arm, brake shoes 2 and 3 are moved out of engagement with drum 1. Upon full movement of the solenoid the free end of brake shoe 3 rests on stop 19 and it is apparent that by properly adjusting said stop equalization of the clearance between the brake shoes and the drum is insured.

It should be noted that with the parts arranged as above described a relatively long stroke solenoid can be employed and it should also be noted that during release of the brake the load on the solenoid is substantially constant throughout its entire operating range, such load being determined by the weight of arm 13, member 16 and shoe 2. These features are especially important where an alternating current operating solenoid is employed since the pull of an alternating current solenoid is substantially constant throughout its entire operating range and the size of the solenoid required to effect release of the brake is largely dependent upon its stroke. Furthermore, it is apparent that if the solenoid is of such size as to provide a slightly greater pull than that required to effect release of the brake, destructive hammering of the plunger within the solenoid will be minimized.

As before stated the maximum braking effect is obtained when spring 20 is adjusted to lift arm 13 out of engagement with stop 18. Under such conditions upon setting of the brake arm 13 tends to rebound under the action of spring 23. However, this tendency is eliminated through engagement of said arm with stop 18.

Stop 22 as before stated normally clears the underside of brake shoe 2 and it is thus necessary to occasionally adjust said stop to compensate for wear of the linings on the brake shoes. However, it should be noted that such adjustment effects only a very slight variation in the position of the plunger whereby sealing thereof is always insured.

What I claim as new and desire to secure by Letters Patent is:

1. The combination with a brake drum and cooperating brake shoes of a weighted operating arm tending to move under the action of gravity towards a given position, means operatively connecting said arm to said shoes to provide for release of the latter upon movement of the former out of said given position and spring means tending to move said arm out of said given position and to effect setting of said brake shoes, said spring means being ineffective after a slight initial movement of said arm out of said given position.

2. The combination with a brake drum and cooperating brake shoes of operating means for said shoes including a weighted arm tending to move in one direction under the action of gravity to effect setting of said shoes and movable in an opposite direction for release thereof, a fixed stop for limiting movement of said arm under the action of gravity, and spring means for effecting setting of said shoes, said spring means tending to move said arm out of engagement with said stop and being ineffective upon a slight initial movement of said arm out of engagement with said stop.

3. The combination with a brake drum and cooperating brake shoes of operating means for said shoes including a weighted arm tending to move in one direction under the action of gravity to effect setting of said shoes and movable in an opposite direction for release thereof, a fixed stop for limiting movement of said arm under the action of gravity, spring means for effecting setting of said shoes, said spring means tending to move said arm out of engagement with said stop and being ineffective upon a slight initial movement of said arm out of engagement with said stop and an operating solenoid connected to said arm.

4. The combination with a brake drum and cooperating pivoted brake shoes arranged on opposite sides thereof, of a weighted operating arm pivotally connected to one of said brake shoes and tending to move under the action of gravity to a given position, means connecting said arm to the other of said brake shoes and providing for release of said shoes from said drum upon movement of said arm out of said given position, a spring associated with said means and tending to move said arm out of said given position and to effect setting of said brake shoes, and a solenoid for moving said arm out of said given position for release of said brake shoes.

5. The combination with a brake drum having opposed pivoted brake shoes associated therewith, of an operating arm pivotally connected to one of said brake shoes and tending to move under the action of gravity to a given position, an operating connection between said arm and the other of said brake shoes, said connection providing for release of said brake shoes upon movement of said arm out of said given position, spring means associated with said operating connection tending to move said arm out of said given position and to effect setting of said brake shoes, said arm being uninfluenced by said spring means upon movement thereof out of said given position and an operating solenoid associated with said arm to effect release of said brake shoes.

6. The combination with a brake drum and opposed pivoted brake shoes therefor, one being arranged above said drum and the other below same, a weighted operating arm pivotally connected to the free end of the latter brake shoe and tending to move under the action of gravity to a given position, a member pivotally connected to said arm, and having a stop associated therewith for engaging said upper brake shoe, said stop being normally out of engagement with said upper brake shoe and being adapted upon movement of said arm out of said given position to engage the same and effect release of both of said brake shoes, spring means associated with said member to effect setting of said brake shoes, said means tending to move said arm out of said given position and being ineffective upon engagement of said stop with said upper shoe and an operating solenoid associated with said arm to effect release of said brake shoes.

7. The combination with a brake drum and cooperating upper and lower brake shoes pivoted to one side thereof, a weighted brake operating arm pivotally connected to the free end of said lower brake shoe and extending below said drum, a member pivotally connected to said arm and having a stop associated therewith for engaging said upper brake shoe to effect release of said shoes upon movement of said arm out of a given position, said stop being normally out of engagement with said upper brake shoe, a spring associated with said member to effect setting of said shoes, said spring being ineffective when said stop is in engagement with said upper shoe and an alternating current operating solenoid for said arm connected thereto at a point adjacent the free end thereof.

8. The combination with a brake drum and cooperating upper and lower brake shoes of a supporting base having said brake shoes pivotally connected thereto at one side of said drum, a brake operating arm pivotally connected to the free end of said lower brake shoe and tending to move downwardly under the action of gravity, a member pivotally connected to said arm and having a stop associated therewith for engaging said upper brake shoe to effect release of both of said shoes upon movement of said member out of a given position, said stop being normally out of engagement with said upper brake shoe, a spring associated with said member tending to move said arm upwardly out of said given position and to effect setting of said brake shoes, said spring being ineffective upon engagement of said stop with said upper brake shoe and a solenoid fixed to said base and having its plunger connected to said arm at a point adjacent the free end thereof.

9. The combination with a brake drum and cooperating brake shoes of an operating arm biased towards a given position, means operatively connecting said arm to said shoes to provide for release of the latter upon movement of the former out of said given position, and spring means tending to move said arm out of said given position and to effect setting of said brake shoes, said spring means being ineffective after a slight initial movement of said arm out of said given position.

10. The combination with a brake drum and cooperating brake shoes of operating means for said shoes including an arm biased to move in one direction to effect setting of said shoes and movable in an opposite direction for release thereof, a stop for limiting movement of said arm in the former direction, spring means for effecting setting of said shoes, said spring means tending to move said arm out of engagement with said stop and being ineffective upon a slight initial movement of said arm out of engagement with said stop, and electromagnetic means for operating said arm.

In witness whereof, I have hereunto subscribed my name.

HOWARD E. HODGSON.

DISCLAIMER.

1,532,138.—*Howard E. Hodgson*, Milwaukee, Wisconsin. ELECTROMAGNETIC BRAKES. Patent dated April 7, 1925. Disclaimer filed October 13, 1926, by the assignee, *The Cutler-Hammer Mfg. Co.*

Hereby makes this disclaimer to that part of the claims in said specification which is in the following words, to wit:

"1. The combination with a brake drum and cooperating brake shoes of a weighted operating arm tending to move under the action of gravity towards a given position, means operatively connecting said arm to said shoes to provide for the release of the latter upon movement of the former out of said given position and spring means tending to move said arm out of said given position and to effect setting of said brake shoes, said spring means being ineffective after a slight initial movement of said arm out of said given position.

"2. The combination with a brake drum and cooperating brake shoes of operating means for said shoes including a weighted arm tending to move in one direction under the action of gravity to effect setting of said shoes and movable in an opposite direction for release thereof, a fixed stop for limiting movement of said arm under the action of gravity, and spring means for effecting setting of said shoes, said spring means tending to move said arm out of engagement with said stop and being ineffective upon a slight initial movement of said arm out of engagement with said stop.

"3. The combination with a brake drum and cooperating brake shoes of operating means for said shoes including a weighted arm tending to move in one direction under the action of gravity to effect setting of said shoes and movable in an opposite direction for release thereof, a fixed stop for limiting movement of said arm under the action of gravity, spring means for effecting setting of said shoes, said spring means tending to move said arm out of engagement with said stop and being ineffective upon a slight initial movement of said arm out of engagement with said stop and an operating solenoid connected to said arm.

"4. The combination with a brake drum and cooperating pivoted brake shoes arranged on opposite sides thereof, of a weighted operating arm pivotally connected to one of said brake shoes and tending to move under the action of gravity to a given position, means connecting said arms to the other of said brake shoes, and providing for release of said shoes from said drum upon movement of said arm out of said given position, a spring associated with said means and tending to move said arm out of said given position and to effect setting of said brake shoes, and a solenoid for moving said arm out of said given position for release of said brake shoes.

"5. The combination with a brake drum having opposed pivoted brake shoes associated therewith, of an operating arm pivotally connected to one of said brake shoes and tending to move under the action of gravity to a given position, an operating connection between said arm and the other of said brake shoes, said connection providing for release of said brake shoes upon movement of said arm out of said given position, spring means associated with said operating connection tending to move said arm out of said given position and to effect setting of said brake shoes, said arm being uninfluenced by said spring means upon movement thereof out of said given position and an operating solenoid associated with said arm to effect release of said brake shoes.

"9. The combination with a brake drum and cooperating brake shoes of an operating arm biased toward a given position, means operatively connecting said arm to said shoes to provide for release of the latter upon movement of the former out of said given position, and spring means tending to move said arm out of said given position and to effect setting of said brake shoes, said spring means being ineffective after a slight initial movement of said arm out of said given position.

"10. The combination with a brake drum and cooperating brake shoes of operating means for said shoes including an arm biased to move in one direction to effect setting of said shoes and movable in an opposite direction for release thereof, a stop for limiting movement of said arm in the former direction, spring means for effecting setting of said shoes, said spring means tending to move said arm out of engagement with said stop and being ineffective upon a slight initial movement of said arm out of engagement with said stop, and electromagnetic means for operating said arm."

[*Official Gazette November 2, 1926.*]